Feb. 14, 1961     J. S. COULTER     2,971,209
INDICATOR FOR AUTOMOBILE WINDSHIELD WIPERS
Filed Jan. 20, 1958

INVENTOR.
Joseph S. Coulter
BY
Parker & Carter
Attorneys

United States Patent Office 2,971,209
Patented Feb. 14, 1961

2,971,209

INDICATOR FOR AUTOMOBILE WINDSHIELD WIPERS

Joseph S. Coulter, Chicago, Ill.
(1831 Kiest Ave., Northbrook, Ill.)

Filed Jan. 20, 1958, Ser. No. 709,947

4 Claims. (Cl. 15—250.40)

My invention resides in the field of cleaning and wiping devices and is particularly concerned with wiping devices utilizing flexible materials such as rubber to scrape or remove liquids or solids from substantially continuous surfaces.

Accordingly, a primary object of my invention is to provide a cleaning and wiping device which will have a long and useful life but which will automatically indicate when the point of exhaustion is reached and replacement is required.

Another object is the provision of a windshield or plate glass wiper blade which will be indicative of the extent of use it has undergone in order to facilitate timely replacement thereof.

A further object is the provision of a wiper blade consisting of a substantially solid core element with a surrounding jacket bonded thereto, the jacket and core being composed of rubber of comparable quality and contrasting colors.

Yet another object is the provision of an automotive safety device which eliminates the hazards of bad weather driving resulting from defective windshield wipers.

Other objects will become apparent from time to time throughout the course of the ensuing specification.

Figure 1:
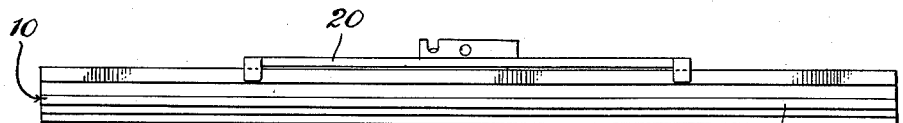

My new and improved wiper blade is diagrammatically illustrated in the accompanying figures, in which Figure 1 is a side elevation of a typical windshield wiper assembly.

Figure 2:
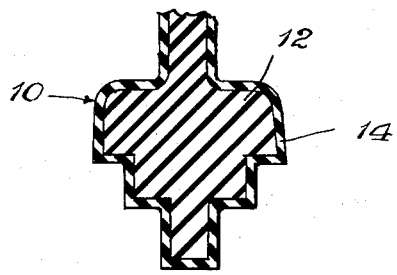
Figure 3:
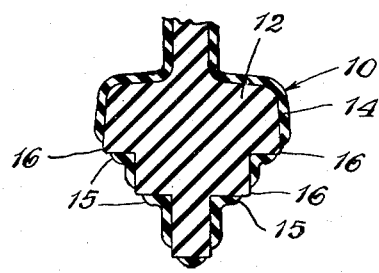

Figure 2 is a cross section through the wiper blade of Figure 1 illustrating its initial contour; and Figure 3 is the same cross sectional view after the wiper has been used.

Like reference numerals indicate like parts throughout the drawing.

For use in cleaning large surfaces, rubber has been widely employed because of its flexible nature. In the cleaning of plate glass windows and automotive windshields for example, rubber is ideal because it is flexible enough to deform slightly to follow the contour of the surfaces over which it passes yet is strong enough to resist the normal forces used to move it across the surfaces. Automobile windshield wiper blades for example are generally pulled across the windshield thus alternately exposing one side and then the other to the scraping action over the glass surface. The action is similar with squeegees. In today's modern cars the windshields are slightly curved near the ends and to some extent from top to bottom. Rubber wiper blades will easily conform to these surface contour changes and consequently rubber is used nearly exclusively for this purpose.

Despite this apparent suitability for windshield wipers, rubber has certain inherent defects which combine to create a safety hazard when a blade is kept in operation beyond its useful life. Both the natural and the synthetic rubbers such as G R.S., the neoprenes, and the nitril rubbers have these defects.

None of these rubbers are completely stable with respect to age. During aging at normal temperature, rubber oxidizes slowly and there is a consequent loss of tensile strength and a change in stiffness. It either hardens to a resinous state or softens to a gummy state. Organic age resistors decrease the rate of oxidation, but do not eliminate the problem. Oxidation is even faster at elevated temperatures.

In many applications, and automotive windshield wipers is an excellent example, the rubber is subjected to alternate stresses. These stresses eventually induce flexing or dynamic fatigue.

Rubber also suffers a loss in contour due to abrasion, and rubber that is continually exposed to sunlight often cracks. This cracking may be reduced by suitable agents but the addition of these retarding agents often times produces a rough barklike surface.

Finally, all the rubbers have a tendency to harden due to crystallization.

The combination of these inherent defects of rubber tends to limit the useful life of a windshield wiper blade to a rather definite period. When the rubber has become hard and the surface irregular due to cracking and abrasion it will not properly remove muddy water or snow. Streaks appear on the windshield when the rubber has flaked off due to oxidation or otherwise. The average motorist does not replace his wiper blades as soon as he should. By the time he goes to a gas station he may have completely forgotten the trouble he had with his blades in the last rain storm. By using my new and improved wiper blades a motorist is reminded to replace the blades before they are completely worn out and a safety hazard is created.

Referring now to Figure 1, a typical windshield wiper blade assembly is shown as comprised of a blade indicated at 10, and a supporting structure 20 to which the blade is attached. The supporting structure in turn will be attached to the wiper motor, not shown. In Figure 2 the blade is shown as comprised of an inner core 12 and an outer jacket 14. Both the jacket and the core in the drawing are shown as composed of rubber of comparable wearing quality but they are of contrasting colors.

To conform to the present style in wiper blades, the jacket will usually be black and the inner core white. There is no reason why they may not be of any other color which can be successfully created in rubber.

Any suitable method may be employed to join the jacket to the core. A bond may be effected simply by the application of heat or pressure, or a suitable bonding agent may be employed. The type of bonding agent will depend upon the type of rubber used in the blade, and it may be possible to use vulcanizing, non-vulcanizing, thermoplastic or thermosetting cements. For example if the jacket and core are composed of neoprene, then a cement known as A–68–B which is a neoprene black air-drying cement may be used.

In Figure 3 the blade is shown after having been in extended use. The jacket has been worn out as at 15 to expose the edges or projections of the core 16. When a worn blade is viewed from the side as in Figure 1 the inner core will appear as a series of white streaks extending longitudinally of the blade body.

The jacket and core may or may not be of a substantially similar composition.

It may be that under some conditions the core will go dead before the jacket due perhaps to greater flexure stresses or other causes. To overcome this it may be advantageous to incorporate a depressant or disintegrator into the jacket material which will cause it to wear out at approximately the same time that the body goes dead. If the jacket is a rubber base, peroxide or a material which will give up oxygen or ozone to the rubber may be used to bring the useful life of the jacket into line with the core. A trace of heavy metal ions, such as copper, may be added.

It is essential however that the jacket be of such a thickness that it wil give out at approximately the same time that the core element loses its flexibility and strength, i.e. goes dead. It is then an easy matter to detect the exhaustion of the blade for the contrasting white and black streaks will be easily visible to the gas station attendant when he wipes the windshield. The motorist thus does not need to keep in mind the fact that he needs a new windshield wiper. Furthermore there can be no doubt as to the need when the occasion rises.

I have shown and described a preferred embodiment of my invention but it will be understood that I do not wish to be limited to this showing for I contemplate that many changes may be made in the size, shape, and disposition of parts without departing from the essential spirit of my invention. For example the cross sectional blade configuration is illustrative only and the actual blade shape may be varied widely. In addition, some blades on the market today have equi-distantly disposed beads or projections running the length of the blade. After extended use of this style of wiper the wear indicating streaks would appear as short white lines disposed laterally with respect to the longitudinal axis of the blade. Accordingly, I do not wish to be limited except by the scope of the following appended claims.

I claim:

1. A composite flexible blade for windshield wipers, squeegees and other wiper assemblies including a solid core composed of a material having the general properties with respect to hardness and wearing characteristics as rubber, and a jacket encasing the core, said jacket being securely bonded to the core and having a generally uniform thickness substantially less than that of the core at least in that portion surrounding the working portion of the core, said jacket being of a contrasting color to the core and having hardness and wear characteristics similar to the core so that exhaustion and fatigue failure of the core and jacket will occur substantially simultaneously, and a depressant incorporated into the jacket to accelerate the failure of the jacket.

2. A composite blade for windshield wipers, squeegees and other wiper assemblies including a solid core composed of a material having the general properties with respect to hardness and wearing characteristics as rubber, and a jacket substantially encasing the entire core, said jacket being securely bonded to the core and having a generally uniform thickness substantially less than that of the core at least in that portion surrounding the working portion of the core, said jacket being of a contrasting color to the core and having hardness and wear characteristics similar to the core so that exhaustion and fatigue failure of the core and jacket will occur substantially simultaneously.

3. A unitary, multiple-thickness wiper blade for use in cleaning and wiping assemblies such as automobile windshield wipers, window squeegees and the like which automatically visually indicates when the assembly has reached a point of dynamic failure including a substantially solid interior core having the same general properties with respect to flexure and hardness as rubber, and an exterior jacket having substantially identical properties and of a contrasting color, the jacket covering substantially the entire exposed outer surface of said core, the jacket being bonded to the core and having a thickness substantially and proportionately less than that of the core so that when the useful life of the core has been exhausted, the outer jacket will have been worn through to expose the core.

4. The flexible blade of claim 1 further characterized in that the core and jacket are rubber and the depressant is a material which yields oxygen to the jacket.

References Cited in the file of this patent

UNITED STATES PATENTS

| | | |
|---|---|---|
| 1,978,633 | Horton | Oct. 30, 1934 |
| 2,102,784 | Bridges | Dec. 21, 1937 |
| 2,735,129 | Lorenz | Feb. 21, 1956 |

FOREIGN PATENTS

| | | |
|---|---|---|
| 11,954 | Australia | Feb. 25, 1928 |
| 264,454 | Germany | Feb. 1, 1913 |
| 487,957 | Canada | Nov. 11, 1952 |
| 622,370 | Great Britain | May 2, 1949 |

OTHER REFERENCES

The Saturday Evening Post, Aug. 7, 1937, page 63.